United States Patent
Lee et al.

(10) Patent No.: US 10,005,066 B2
(45) Date of Patent: Jun. 26, 2018

(54) CATALYST CARRIER AND METHOD FOR PRODUCING THE SAME

(71) Applicant: SHOWA DENKO K.K., Tokyo (JP)

(72) Inventors: Kunchan Lee, Tokyo (JP); Hiroshi Takahashi, Tokyo (JP); Tomoya Kitagawa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days. days.

(21) Appl. No.: 15/531,175

(22) PCT Filed: Nov. 24, 2015

(86) PCT No.: PCT/JP2015/082830
§ 371 (c)(1),
(2) Date: May 26, 2017

(87) PCT Pub. No.: WO2016/084762
PCT Pub. Date: Jun. 2, 2016

(65) Prior Publication Data
US 2017/0326532 A1    Nov. 16, 2017

(30) Foreign Application Priority Data

Nov. 28, 2014 (JP) ................................ 2014-241770

(51) Int. Cl.
*B01J 23/06* (2006.01)
*B01J 23/16* (2006.01)
(Continued)

(52) U.S. Cl.
CPC ............... *B01J 21/18* (2013.01); *B01J 23/89* (2013.01); *B01J 35/10* (2013.01); *B01J 37/08* (2013.01);
(Continued)

(58) Field of Classification Search
CPC ... B01J 21/18; B01J 23/06; B01J 23/16; B01J 23/26; B01J 23/40; B01J 23/52;
(Continued)

(56) References Cited

U.S. PATENT DOCUMENTS 3,964,933 A * 6/1976 Fung .................. H01M 4/96
429/231.8
5,037,791 A * 8/1991 Comolli .................. B01J 21/18
208/217
(Continued)

FOREIGN PATENT DOCUMENTS

JP    2001-357857 A    12/2001
JP    2004-342505 A    12/2004
(Continued)

OTHER PUBLICATIONS

Written Opinion of the International Searching Authority for PCT/JP2015/082830 dated Feb. 2, 2016.
(Continued)

*Primary Examiner* — Patricia L. Hailey
(74) *Attorney, Agent, or Firm* — Sughrue Mion, PLLC

(57) ABSTRACT

A catalyst carrier, an electrode catalyst, an electrode including the catalyst, a membrane electrode assembly including the electrode, and a fuel cell including the membrane electrode assembly. The catalyst carrier includes a carbon material having a chain structure including a chain of carbon particles, and an oxide-carbon composite particle in which a carbon particle encloses a particle of an oxide of a group IV element on the periodic table, the oxide-carbon composite particle being contained in the carbon material. The catalyst carrier has a BET specific surface area of 450 to 1100 $m^2/g$.

22 Claims, 5 Drawing Sheets

(51) Int. Cl.
*B01J 23/26* (2006.01)
*B01J 23/40* (2006.01)
*B01J 23/52* (2006.01)
*B01J 21/18* (2006.01)
*B01J 35/10* (2006.01)
*B01J 37/08* (2006.01)
*B01J 23/89* (2006.01)
*H01M 4/92* (2006.01)
*H01M 4/96* (2006.01)
*H01M 8/10* (2016.01)

(52) U.S. Cl.
CPC ............... *H01M 4/92* (2013.01); *H01M 4/96* (2013.01); *H01M 8/10* (2013.01)

(58) Field of Classification Search
CPC  B01J 23/89; B01J 35/10; H01M 4/92; H01M 4/96; H01M 8/10
USPC ......... 502/182, 185; 429/483–485, 487, 488, 429/524–528
See application file for complete search history.

(56) References Cited

U.S. PATENT DOCUMENTS

| | | | |
|---|---|---|---|
| 6,897,177 B2* | 5/2005 | Van Berge | B01J 23/75 502/185 |
| 2002/0009626 A1 | 1/2002 | Terazono et al. | |
| 2004/0065619 A1* | 4/2004 | Klabunde | B01D 53/02 210/681 |
| 2005/0112451 A1 | 5/2005 | Lee et al. | |
| 2006/0188775 A1* | 8/2006 | Mance | H01M 4/8652 429/482 |
| 2011/0015058 A1 | 1/2011 | Maki | |
| 2011/0104553 A1* | 5/2011 | Pol | B82Y 30/00 429/156 |
| 2012/0028792 A1* | 2/2012 | Hattori | H01M 4/8657 502/182 |
| 2012/0183869 A1* | 7/2012 | Jin | H01M 4/8657 429/405 |
| 2013/0330659 A1 | 12/2013 | Horikita et al. | |
| 2014/0349212 A1 | 11/2014 | Tezuka et al. | |
| 2015/0133291 A1* | 5/2015 | Datye | B01J 35/0013 502/182 |
| 2015/0155569 A1 | 6/2015 | Tezuka et al. | |
| 2016/0108266 A1* | 4/2016 | Kosydar | C09D 11/38 522/8 |

FOREIGN PATENT DOCUMENTS

| | | | | |
|---|---|---|---|---|
| JP | 2005-150085 A | | 6/2005 | |
| JP | 2008-027847 A | | 2/2008 | |
| JP | 2009-255053 A | | 11/2009 | |
| JP | 2013-020793 A | | 1/2013 | |
| JP | 2013-033701 A | | 2/2013 | |
| JP | 2013-157289 A | | 8/2013 | |
| KR | 10-08365090000 | * | 6/2008 | ............. H01M 4/04 |
| WO | 2011/099498 A1 | | 8/2011 | |
| WO | 2012/114778 A1 | | 8/2012 | |
| WO | 2013/105292 A1 | | 7/2013 | |
| WO | 2014/010278 A1 | | 1/2014 | |

OTHER PUBLICATIONS

International Search Report for PCT/JP2015/082830, dated Feb. 2, 2016.

* cited by examiner

[FIG. 1]
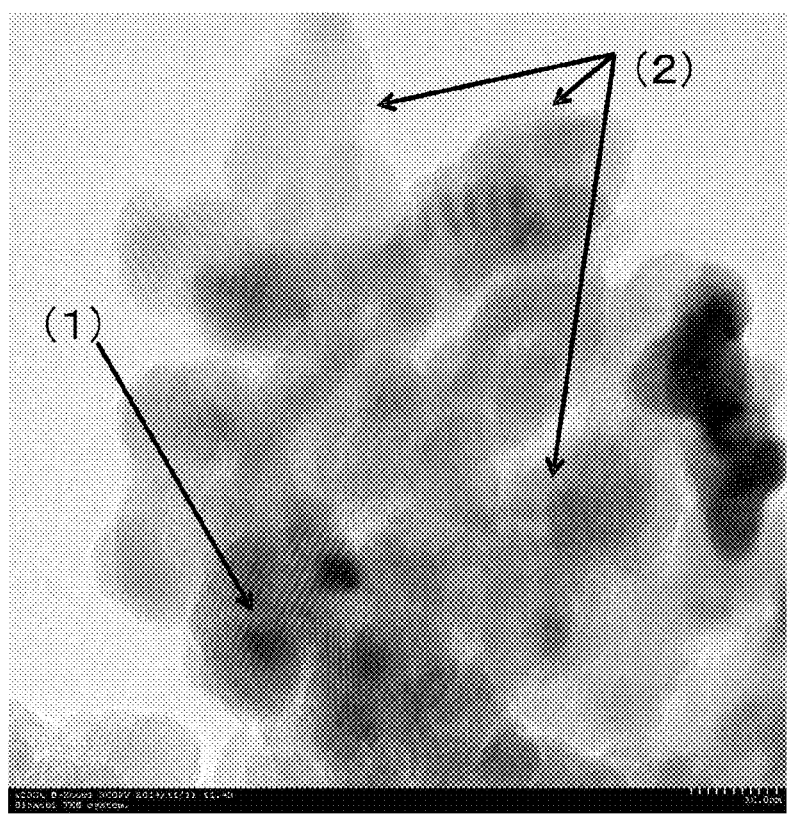

[FIG. 2]
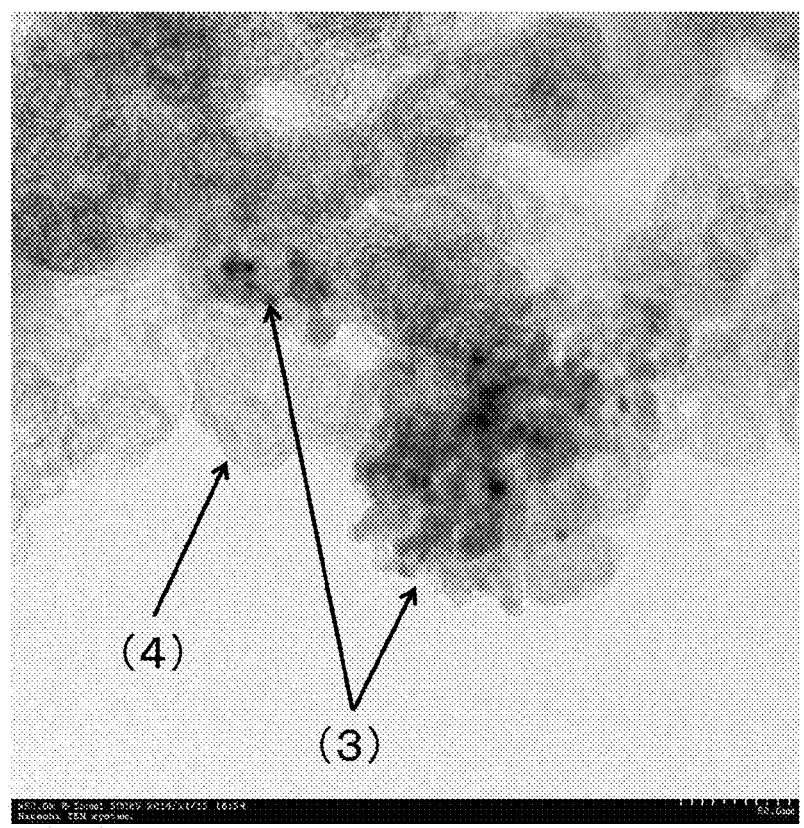

[FIG. 3]
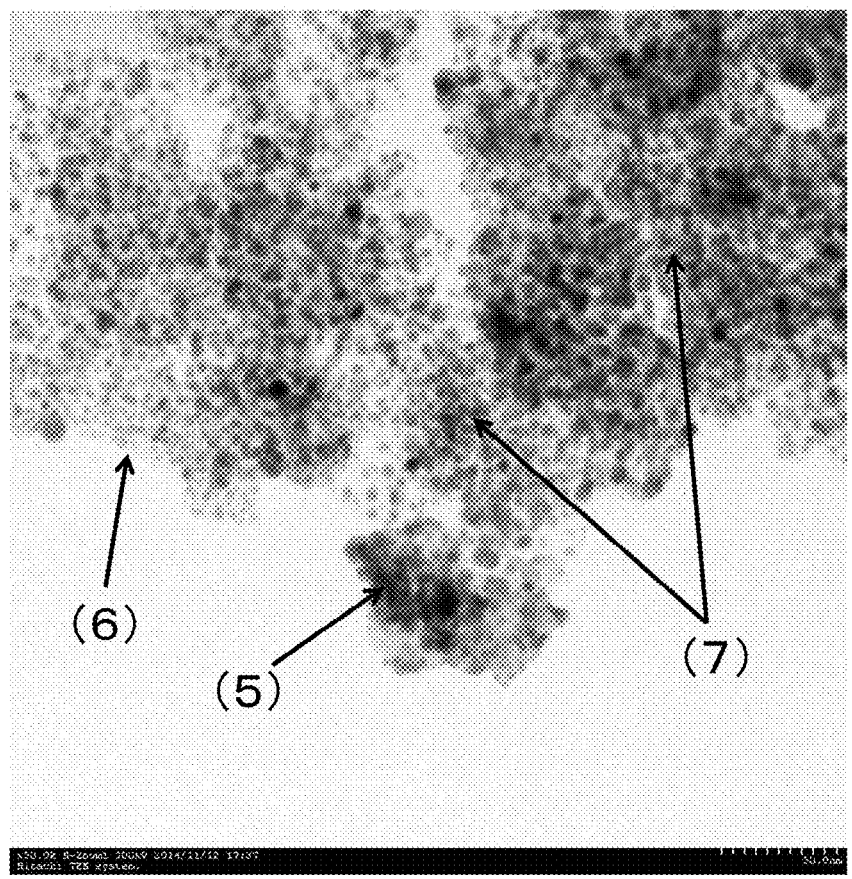

[FIG. 4]
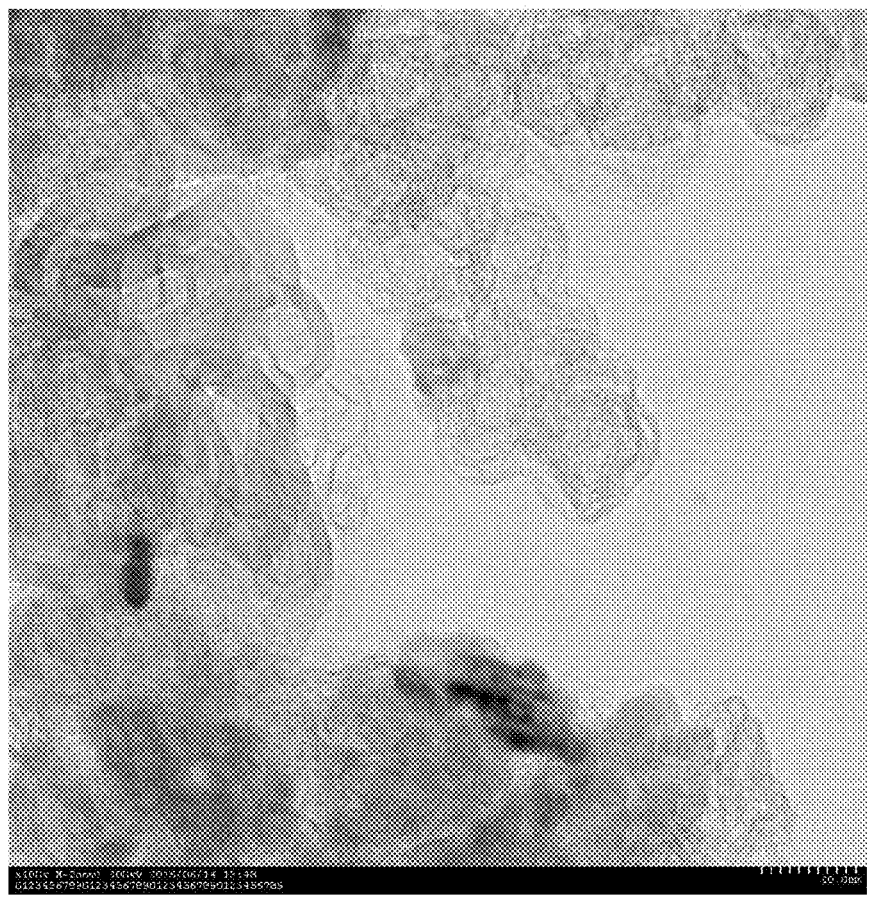

[FIG. 5]
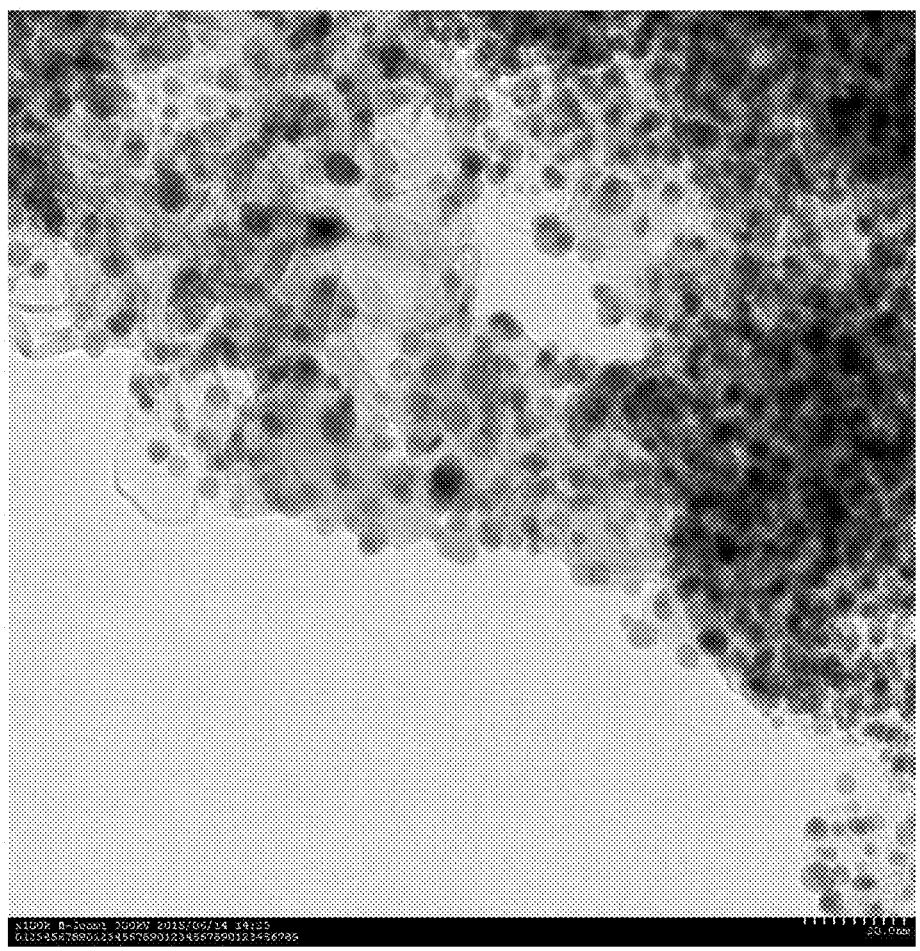

CATALYST CARRIER AND METHOD FOR PRODUCING THE SAME

CROSS REFERENCE TO RELATED APPLICATIONS

This Application is a National Stage of International Application No. PCT/JP2015/082830 filed Nov. 24, 2015, claiming priority based on Japanese Patent Application No. 2014-241770 filed Nov. 28, 2014, the contents of all of which are incorporated herein by reference in their entirety.

TECHNICAL FIELD

The present invention relates to a catalyst carrier, a catalyst metal, an electrode catalyst, an ink containing the electrode catalyst, a catalyst layer containing the electrode catalyst, an electrode including the catalyst layer, a membrane electrode assembly including the catalyst layer, and a fuel cell including the membrane electrode assembly.

BACKGROUND ART

Electrode catalysts in which a catalyst metal containing platinum is supported on a carbon carrier have been mainly used for solid polymer fuel cells. However, carbon carriers that have been used as catalyst carriers are easily oxidized during high-potential operation such as start-stop operation of fuel cells. Therefore, for example, the supported catalyst metals aggregate and separate, which mainly causes the degradation of the performance of electrode catalysts.

In order to reduce the load of auxiliaries of fuel cell systems, a fuel cell is desirably operated while a low-humidification gas is supplied. However, if the fuel cell is operated under the low-humidification conditions, the proton conductivity of ionomers in an electrolyte membrane and a catalyst layer is degraded because of a dry-up phenomenon, which decreases the output of the fuel cell.

PTL 1 discloses that, in order to improve the durability of carbon carriers during high-potential operation, the degree of crystallinity of carbon carriers is increased through heat treatment to suppress the oxidation of the carbon carriers during the operation of fuel cells. However, only the heat treatment of carbon carriers cannot achieve high oxidation resistance of carbon carriers during high-potential operation. In particular, it is difficult to prevent the degradation of the performance of fuel cells during operation under low-humidification conditions. Furthermore, if a carbon carrier having a high degree of graphitization is used, the corrosion resistance improves, but the specific surface area of the carbon carrier decreases, which degrades the power generation performance.

Technical Document 2 discloses an electrode catalyst obtained by physically mixing a carbon carrier that supports a catalyst metal and an acidic oxide in order to improve the durability while maintaining high activity of a catalyst. However, the carbon carrier is highly hydrophobic and the acidic oxide is highly hydrophilic, and thus it is very difficult to physically mix such catalyst carriers having different physical properties in a uniform manner. The nonuniform physical mixing causes a variation in the catalytic performance and also causes, for example, unevenness and cracking during coating of a catalyst layer, which degrades the performance.

PTL 3 discloses that a catalyst material containing hydrophilic particles of zeolite, titanium dioxide, or the like is used for an anode in order to maintain the cell performance to some degree during operation under low-humidification conditions. However, such a catalyst material does not exhibit electric conductivity, and thus the internal resistance of the catalyst layer is expected to increase.

PTL 4 discloses a carbon material for carriers of fuel cells, the carbon material being obtained by mixing a moisture-retentive carbon material and carbon black. In this technique, the occlusion and release of water vapor by an activated carbon material can be expected to some degree. However, the water retention property is not sufficiently imparted to ionomers in an electrolyte membrane and a catalyst layer during the operation of a fuel cell under low-humidification conditions, and thus high cell output cannot be achieved. Furthermore, the carbon material is a carbon material into which micropores are introduced to impart the water retention property to the carbon material. Therefore, the carbon material is very easily oxidized during high-potential operation of fuel cells, which may degrade the durability.

PTL 5 discloses an electrode catalyst obtained by calcining zirconium and a carbon material precursor. However, a high cell output cannot be achieved using a catalyst that does not contain a noble metal such as Pt.

CITATION LIST

Patent Literature

PTL 1: JPA 2001-357857
PTL 2: JPA 2013-33701
PTL 3: JPA 2004-342505
PTL 4: JPA 2013-20793
PTL 5: JPA 2009-255053

SUMMARY OF INVENTION

Technical Problem

It is an object of the present invention to provide a catalyst carrier that provides a catalyst whose performance degradation is small under low-humidification conditions and which exhibits high durability, an electrode catalyst, an electrode including the catalyst, a membrane electrode assembly including the electrode, and a fuel cell including the membrane electrode assembly.

Solution to Problem

The present invention includes the following inventions [1] to [22].
[1] A catalyst carrier includes a carbon material having a chain structure including a chain of carbon particles, and an oxide-carbon composite particle in which a carbon particle encloses a particle of an oxide of a group IV element on the periodic table, the oxide-carbon composite particle being contained in the carbon material, wherein the catalyst carrier has a BET specific surface area of 450 to 1100 $m^2/g$.
[2] In the catalyst carrier according to [1], the catalyst carrier has a dibutyl phthalate absorption of 150 to 450 mL/100 g.
[3] In the catalyst carrier according to [1] or [2], a content of the particle of the oxide is 10 to 90 mass %.
[4] In the catalyst carrier according to any one of [1] to [3], the group IV element on the periodic table is titanium or zirconium.
[5] In the catalyst carrier according to any one of [1] to [4], the particle of the oxide of the group IV element on the periodic table has an average particle size of 5 to 300 nm.

[6] In the catalyst carrier according to any one of [1] to [5], carbon that encloses the particle of the oxide of the group IV element on the periodic table in the oxide-carbon composite particle is amorphous carbon and/or graphitized carbon.

[7] In the catalyst carrier according to any one of [1] to [6], the carbon material is one selected from the group consisting of carbon black, graphitized carbon black, graphite, and porous carbon.

[8] In the catalyst carrier according to any one of [1] to [6], the carbon material is a mixture of two or more selected from the group consisting of carbon black, graphitized carbon black, graphite, and porous carbon.

[9] In the catalyst carrier according to any one of [1] to [8], the carbon material has a primary particle size of 5 to 300 nm.

[10] An electrode catalyst in which a catalyst metal particle is supported on the catalyst carrier according to any one of [1] to [9].

[11] In the electrode catalyst according to [10], a metal of the catalyst metal particle is at least one metal selected from the group consisting of platinum, palladium, ruthenium, gold, rhodium, iridium, osmium, iron, cobalt, nickel, chromium, zinc, and tantalum, or an alloy formed of at least two of the foregoing metals.

[12] In the electrode catalyst according to [10] or [11], the electrode catalyst has a BET specific surface area of 200 to 800 $m^2/g$.

[13] An electrode includes an electrode substrate and a catalyst layer containing the electrode catalyst according to any one of [10] to [12], the catalyst layer being formed on the electrode substrate.

[14] A membrane electrode assembly includes a cathode and an anode with an electrolyte membrane disposed therebetween, wherein at least one of the cathode and the anode is the electrode according to [13].

[15] A fuel cell includes the membrane electrode assembly according to [14].

[16] A method for producing a catalyst carrier includes a step of mixing a particle of an oxide of a group IV element on the periodic table and polyvinyl alcohol and heat-treating the mixture in a non-oxidizing gas atmosphere at 500° C. to 1100° C. to obtain an oxide-carbon composite particle in which carbon encloses the particle of the oxide of the group IV element on the periodic table, and a step of mixing a carbon material having a chain structure including a chain of carbon particles and the oxide-carbon composite particle.

[17] In the method for producing a catalyst carrier according to [16], the particle of the oxide of the group IV element on the periodic table has a BET specific surface area of 50 to 300 $m^2/g$.

[18] In the method for producing a catalyst carrier according to [16] or [17], the carbon material has a dibutyl phthalate absorption of 350 to 550 mL/100 g.

[19] In the method for producing a catalyst carrier according to any one of [16] to [18], the carbon material has a BET specific surface area of 700 to 1400 $m^2/g$.

[20] In the method for producing a catalyst carrier according to any one of [16] to [19], the carbon material has a crystallite size of 0.6 to 2.0 nm.

[21] In the method for producing a catalyst carrier according to [16] or [17], the carbon material is a mixture of a carbon material X having a BET specific surface area of 700 to 1400 $m^2/g$ and a carbon material Y having a BET specific surface area of 100 to 500 $m^2/g$.

[22] In the method for producing a catalyst carrier according to [21], the carbon material Y has a primary particle size of 5 to 300 nm and a crystallite size of 2.0 to 5.0 nm.

[23] In the method for producing a catalyst carrier according to any one of [16] to [22], the carbon material and the oxide-carbon composite particle are mixed using a ball mill.

Advantageous Effects of Invention

The present invention provides a catalyst carrier that can provide a catalyst whose performance degradation is small during operation under low-humidification conditions and which can maintain high output. A fuel cell obtained by using the catalyst carrier has high durability against load fluctuation and start-stop operation.

BRIEF DESCRIPTION OF DRAWINGS

FIG. 1 is a transmission electron micrograph of carbon particles B(1) obtained in Example 1.

FIG. 2 is a transmission electron micrograph of a catalyst carrier (1) obtained in Example 1.

FIG. 3 is a transmission electron micrograph of an electrode catalyst (1) obtained in Example 1.

FIG. 4 is a transmission electron micrograph of a catalyst carrier (5) obtained in Example 5.

FIG. 5 is a transmission electron micrograph of an electrode catalyst (5) obtained in Example 5.

DESCRIPTION OF EMBODIMENTS (Catalyst Carrier)

A catalyst carrier of the present invention includes a carbon material having a chain structure including a chain of carbon particles (hereafter, the carbon particles constituting the chain structure may be referred to as "carbon particles A"), and oxide-carbon composite particles (hereafter may be referred to as "carbon particles B") in which carbon particles enclose particles (hereafter may be referred to as "oxide particles") of an oxide of a group IV element on the periodic table, the oxide-carbon composite particles being contained in the carbon material. The catalyst carrier has a BET specific surface area of 450 to 1100 $m^2/g$.

The BET specific surface area of the catalyst carrier is preferably 450 to 1100 $m^2/g$, more preferably 700 to 1100 $m^2/g$, and particularly preferably 900 to 1100 $m^2/g$ from the viewpoint of catalytic performance described later.

The dibutyl phthalate absorption (hereafter also referred to as a "DBP absorption") of the catalyst carrier is preferably 150 to 450 mL/100 g and more preferably 200 to 450 mL/100 g from the viewpoint of catalytic performance described later.

The content of the oxide particles in the catalyst carrier is preferably 10 to 90 mass %, more preferably 20 to 80 mass %, and particularly preferably 30 to 70 mass % from the viewpoint of catalytic performance described later.

The group IV element on the periodic table is preferably titanium or zirconium and more preferably titanium from the viewpoint of easily achieving high catalytic performance. Specific examples of the oxide of the group IV element on the periodic table include titanium dioxide and zirconium oxide. When the oxide of the group IV element is titanium dioxide, the titanium dioxide may have any crystal structure and preferably has an anatase crystal structure from the viewpoint of performance.

The average particle size of the oxide particles is preferably 5 to 300 nm, more preferably 5 to 200 nm, and particularly preferably 5 to 100 nm from the viewpoint of improving the durability and water retention property. The average particle size is an arithmetic mean of measured diameters of 50 or more oxide particles randomly chosen through observation with a transmission electron microscope.

The carbon that encloses the oxide particles may be highly amorphous carbon or carbon with high degree of graphitization. Alternatively, these carbons may be mixed with each other. The carbon is preferably graphitized carbon from the viewpoint of further improving the durability and water retention property.

The carbon material is preferably one carbon material selected from the group consisting of carbon black, graphitized carbon black, graphite, and porous carbon. A method for producing graphitized carbon black will be described later.

The carbon material is also preferably a mixture of two or more selected from the group consisting of carbon black, graphitized carbon black, graphite, and porous carbon from the viewpoint of easily achieving high catalytic performance. The carbon material is more preferably a mixture of carbon black and graphitized carbon black.

Carbon black is constituted by carbon fine particles that are formed of amorphous carbon and have a chain structure. Carbon black is classified into, for example, furnace black, acetylene black, and thermal black in accordance with the production method thereof, and any of them can be used as a catalyst carrier. Carbon black has a sufficiently large specific surface area. When carbon black is contained in the catalyst carrier, high initial voltage is easily achieved.

Graphitized carbon black can be obtained by heat-treating commercially available carbon black in an inert or reducing gas atmosphere. Graphitized carbon black has a higher degree of graphitization than carbon black. When graphitized carbon black is contained in the catalyst carrier, high durability is easily achieved.

The carbon material is also preferably a mixture of two or more carbon materials. This will be described in detail in "Method for producing catalyst carrier".

Graphitized carbon black may have, in its carbon fine particles, a microstructure in which graphite layers are stacked on top of each other. When graphitized carbon black has, in its carbon fine particles, a microstructure in which graphite layers are stacked on top of each other, the number of layers in the layered structure is preferably 1 to 30 and more preferably 1 to 20. When the number of layers is within this range, the initial activity is high and high durability is easily achieved during start-stop operation. The number of layers is an arithmetic mean of the numbers of layers of 50 layered structures in graphitized carbon black randomly chosen through observation with a transmission electron microscope. It can also be confirmed from the degree of graphitization that graphitized carbon black has, in its carbon fine particles, a microstructure in which graphite layers are stacked on top of each other.

The primary particle size of the carbon material is preferably 5 to 300 nm, more preferably 5 to 100 nm, and particularly preferably 5 to 50 nm from the viewpoint of easily achieving high catalytic performance. The primary particle size is an arithmetic mean of measured diameters of 50 carbon particles (A) contained in the carbon material and randomly chosen through observation with a transmission electron microscope.

(Method for Producing Catalyst Carrier)

A method for producing a catalyst carrier according to the present invention is not particularly limited as long as the above-described catalyst carrier is obtained. For example, the method for producing a catalyst carrier preferably includes a step of mixing particles of an oxide of a group IV element on the periodic table and polyvinyl alcohol and heat-treating the mixture in a non-oxidizing gas atmosphere at 500° C. to 1100° C. to obtain oxide-carbon composite particles (hereafter also referred to as "carbon particles B") in which carbon encloses the particles of the oxide of the group IV element on the periodic table, and a step of mixing a carbon material having a chain structure including a chain of carbon particles (hereafter also referred to as a "carbon material") and the carbon particles B.

It is normally difficult to uniformly mix hydrophobic conductive carbon particles and hydrophilic particles such as an oxide of a group IV element on the periodic table. However, the oxide particles used in the present invention are enclosed by carbon, and thus they are easily mixed with each other in a uniform manner. Therefore, normally, only about 10 minutes to 10 hours are required for the mixing time. Furthermore, they are uniformly mixed with each other. Therefore, the humidity is maintained and the electronic conductivity is improved in an electrode described later, and the degradation of catalysts due to load fluctuation and start-stop operation is suppressed. Thus, the degradation of catalytic performance is expected to be suppressed even under low-humidification conditions.

The mixing of the oxide particles of the group IV element on the periodic table and polyvinyl alcohol and the mixing of the carbon material and the carbon particles B are performed by a solid kneading method. The solid kneading method is preferably a method in which mixing is uniformly performed. Examples of the solid kneading method include methods that use a roll-rotating mill, a ball mill, a medium-stirring mill, an air flow crusher, a mortar, an automatic kneading mortar, a crushing tank, and a jet mill. More preferably, a method that uses a ball mill is employed.

Examples of the gas used in the non-oxidizing gas atmosphere include inert gases and reducing gases such as hydrogen gas. From the viewpoint of being relatively less expensive and easily available, the gas is preferably nitrogen gas, argon, or helium and more preferably nitrogen gas or argon. These gases may be used alone or in combination of two or more.

The BET specific surface area of the oxide particles is preferably 50 to 300 $m^2/g$ and more preferably 100 to 300 $m^2/g$ from the viewpoint of the formation of a composite of the oxide particles and the carbon material and the dispersibility and atomization of a catalyst metal to be supported.

The DBP absorption of the carbon material is preferably 350 to 550 mL/100 g, more preferably 400 to 550 mL/100 g, and particularly preferably 450 to 550 mL/100 g from the viewpoint of electronic conductivity and mixing characteristics.

The BET specific surface area of the carbon material is preferably 700 to 1400 $m^2/g$, more preferably 800 to 1400 $m^2/g$, and particularly preferably 1000 to 1400 $m^2/g$ from the viewpoint of the dispersibility and atomization of a catalyst metal to be supported.

The degree of graphitization of the carbon material is represented by the size Lc of a crystallite in a c-axis direction (hereafter also referred to as a "crystallite size").

The carbon material according to the present invention preferably has a crystallite size of 0.6 to 2.0 nm, more preferably 0.8 to 2.0 nm, and particularly preferably 0.8 to 1.6 nm. At a crystallite size of 0.6 nm or more, the degree of graphitization of a carbon nanoparticle material is high and thus high durability is easily achieved when the fuel cell is subjected to load fluctuation and start-stop operation. At a crystallite size of 2 nm or less, a large specific surface area is easily achieved and thus high catalytic performance is easily achieved.

The carbon material is also preferably a mixture of two or more carbon materials from the viewpoint of achieving both durability and initial performance. When the carbon material is a mixture of two carbon materials, namely a carbon material X and a carbon material Y, the BET specific surface area of the carbon material X is preferably 700 to 1400 $m^2/g$, more preferably 800 to 1400 $m^2/g$, and particularly preferably 900 to 1400 $m^2/g$. The BET specific surface area of the carbon material Y is preferably 100 to 500 $m^2/g$, more preferably 100 to 400 $m^2/g$, and particularly preferably 100 to 350 $m^2/g$. When the BET specific surface areas of the two carbon materials are within these ranges, the initial activity is high and high durability during start-stop operation is easily achieved.

The primary particle size of the carbon material Y having the above BET specific surface area is preferably 5 to 300 nm, more preferably 5 to 100 nm, and particularly preferably 5 to 50 nm from the viewpoint of achieving high catalytic performance. The primary particle size is an arithmetic mean of measured diameters of 50 or more carbon particles in the carbon material Y randomly chosen through observation with a transmission electron microscope.

The crystallite size of the carbon material Y having the above BET specific surface area is preferably 2.0 to 5.0 nm, more preferably 2.0 to 4.5 nm, and particularly preferably 2.5 to 4.5 nm. When the crystallite size is within the above range, high durability during start-stop operation is easily achieved.

The carbon material Y having the above physical properties is preferably formed of, among commercially available carbon materials, a carbon material constituted by carbon fine particles that are formed of amorphous carbon and have a chain structure. The carbon material Y can be obtained by heat-treating the commercially available carbon material in an inert or reducing gas atmosphere at 2200° C. to 3000° C. for 4 hours, for example. The inert or reducing gas atmosphere may be the above-described atmosphere.

An example of the carbon material Y that satisfies both the requirements of the primary particle size and the crystallite size is graphitized carbon black. Such graphitized carbon black can be obtained by heat-treating carbon black in an inert or reducing gas atmosphere, and has higher degree of graphitization than carbon black. When graphitized carbon black is contained in the catalyst carrier, high durability is easily achieved.

(Electrode Catalyst)

An electrode catalyst of the present invention is obtained by allowing catalyst metal particles to be supported on the catalyst carrier.

The metal of the catalyst metal particles is preferably at least one metal selected from the group consisting of platinum, palladium, ruthenium, gold, rhodium, iridium, osmium, iron, cobalt, nickel, chromium, zinc, and tantalum or an alloy formed of two or more of the foregoing metals, and more preferably platinum or a platinum alloy from the viewpoint of easily achieving high catalytic performance. When the alloy is a platinum alloy, the alloy component other than platinum is preferably at least one metal selected from the group consisting of palladium, ruthenium, gold, rhodium, iridium, osmium, iron, cobalt, nickel, chromium, zinc, and tantalum, preferably at least one metal selected from the group consisting of palladium, ruthenium, iron, and cobalt, more preferably at least one metal selected from the group consisting of palladium and cobalt, and particularly preferably cobalt. When the metal or alloy is used as a catalyst metal component, good catalytic activity is easily achieved.

The average particle size of the catalyst metal particles is preferably 2 to 10 nm and more preferably 3 to 7 nm. Such an average particle size is preferred because good catalytic activity is achieved, the stability is also easily maintained in a fuel cell environment, and the durability is improved. The average particle size of the catalyst metal particles is defined in the same manner as in the above-described average particle size of the oxide particles.

The content of the catalyst metal in the entire electrode catalyst is preferably 20 to 70 mass % and more preferably 30 to 50 mass %. The content is preferably within the above range because aggregation and coarsening of the catalyst metal are easily suppressed and the catalytic performance is easily improved.

The BET specific surface area of the electrode catalyst is preferably 200 to 800 $m^2/g$, more preferably 200 to 700 $m^2/g$, and particularly preferably 200 to 600 $m^2/g$ from the viewpoint of easily achieving high catalytic performance.

(Electrode)

The electrode catalyst can be processed into an ink by, for example, a method described in Examples below or a typical method. For example, by applying the obtained ink to an electrode substrate, a catalyst layer containing the electrode catalyst is formed on the surface of the electrode substrate. Thus, an electrode of the present invention can be obtained. That is, the electrode of the present invention includes an electrode substrate and a catalyst layer containing the electrode catalyst and formed on the electrode substrate. When the electrode of the present invention is used as an electrode for fuel cells, the electrode substrate preferably has a gas diffusion layer on its surface. The electrode of the present invention can be used as a cathode and/or an anode.

The electrode of the present invention can be used as a cathode for fuel cells. This provides a fuel cell in which the degradation of catalytic activity is suppressed under low-humidification conditions and which has high durability against load fluctuation and start-stop operation.

The electrode can also be used as an anode for fuel cells that use hydrogen fuel. In this case, the degradation of hydrogen oxidation activity can be suppressed under low-humidification conditions.

The electrode can also be used as an anode for fuel cells that use methanol fuel. In this case, the surface of the electrode has high wettability with methanol, and thus high methanol oxidation activity can be achieved.

(Membrane Electrode Assembly)

A membrane electrode assembly of the present invention includes a cathode and an anode with an electrolyte membrane disposed therebetween, and at least one of the cathode and the anode is the electrode of the present invention.

(Fuel Cell)

A fuel cell of the present invention includes the membrane electrode assembly. Thus, a fuel cell having high output and high durability can be provided.

EXAMPLES

Hereafter, the present invention will be more specifically described based on Examples of the present invention. They are merely examples of the present invention, and do not limit the present invention. The metal element quantitative analysis, the measurement of DBP absorption, the measurement of BET specific surface area, and the observation with transmission electron microscope in Examples and Comparative Examples were performed by the following methods.

1. Metal Element Quantitative Analysis

About 40 mg of a sample was weighed in a beaker. Aqua regia and then sulfuric acid were added thereto and pyrolysis was performed. The resulting pyrolysate was used to prepare a solution having a certain volume using ultrapure water, and then the resulting solution was appropriately diluted. A metal element was quantitatively determined using an ICP emission spectrometer (VISTA-PRO manufactured by SII).

2. Measurement of DBP Absorption

The DBP absorption was determined by measuring the amount of DBP added at 70% of the maximum torque and converting the amount of DBP to the DBP absorption per 100 g of a sample using an Absorptometer (manufactured by Branbender).

3. Measurement of BET Specific Surface Area

The BET specific surface area of a sample was determined with a Macsorb (manufactured by Mountech Co., Ltd.) using nitrogen gas. In the measurement, the pretreatment time was set to 30 minutes and the pretreatment temperature was set to 200° C.

4. Observation with Transmission Electron Microscope

The observation with a transmission electron microscope (TEM) was performed using an H9500 (acceleration voltage: 300 kV) manufactured by Hitachi, Ltd. A sample for observation was prepared by dispersing a sample powder in ethanol using ultrasonic waves to obtain a dispersion liquid and dropping the dispersion liquid onto a TEM observation grid.

5. Crystallite Size

A sample was subjected to powder X-ray diffraction using a Rotor flex manufactured by Rigaku Corporation. The X-ray diffraction was performed in the range of 10° to 90° using a Cu-Kα ray at 50 kW. Herein, the crystallite size was determined from peaks at $20°<2\theta<30°$ on the basis of the Scherrer equation.

Example 1

(Production of Carbon Particles B(1))

Five grams of titanium dioxide particles (anatase, average particle size: 7 nm, ST-01 manufactured by ISHIHARA SANGYO KAISHA, Ltd.) and 5 g of polyvinyl alcohol powder (manufactured by KANTO CHEMICAL Co., Inc.) were uniformly mixed with each other using a ball mill to obtain a solid mixture powder. The resulting powder was inserted into a tube furnace, heated to 700° C. in a hydrogen-nitrogen mixture gas atmosphere containing 4 vol % of hydrogen, and heat-treated at 700° C. for 1 hour to obtain oxide-carbon composite particles (hereafter also referred to as "carbon particles B(1)") in which carbon particles enclose the titanium dioxide particles. FIG. 1 illustrates a transmission electron micrograph of the carbon particles B(1). In FIG. 1, (1) indicates the titanium dioxide particles and (2) indicates carbon in the carbon particles B(1).

(Production of Catalyst Carrier)

A commercially available carbon material (BET specific surface area: 1350 m²/g, DBP absorption: 490 mL/100 g, crystallite size: 1.5 nm, a carbon material having a chain structure including a chain of carbon particles (hereafter also referred to as "carbon particles A(1)")) (hereafter also referred to as "carbon material (1)") and the carbon particles B(1) were mixed with each other using a ball mill to obtain a catalyst carrier (1). The content of the titanium dioxide particles was set to 42 mass % relative to the total mass of the catalyst carrier (1).

FIG. 2 illustrates a transmission electron micrograph of the catalyst carrier (1). In FIG. 2, (3) indicates the carbon particles B(1) and (4) indicates the carbon particles A(1).

(Supporting of Catalyst Component)

To 1 L of pure water, 0.20 g of the catalyst carrier (1) was added, and ultrasonic vibration was performed using an ultrasonic cleaner for 30 minutes or longer. The resulting suspension was stirred for 30 minutes or longer while the liquid temperature was kept at 80° C. To the suspension, 40 mL of an aqueous solution containing 0.517 g (0.195 g in terms of platinum) of chloroplatinic acid hexahydrate and 0.083 g (0.020 g in terms of cobalt) of cobalt(II) acetate tetrahydrate was added dropwise over 1 hour. Herein, by appropriately adding a 1.0 mol/L aqueous sodium hydroxide solution dropwise, the pH of the suspension was kept at about 7.0. Then, the suspension was stirred for 3 hours while the temperature of the suspension was kept at 80° C. Then, 60 ml of an aqueous solution containing 0.583 g of sodium borohydride was added dropwise to the suspension over 30 minutes. Then, the suspension was stirred for 1 hour while the liquid temperature of the suspension was kept at 80° C. After the completion of the reaction, the suspension was cooled to room temperature. Filtration was performed to obtain a black powder, and the black powder was dried.

(Heat Treatment)

The black powder was inserted into a quartz tube furnace, heated to 700° C. at a heating rate of 10° C./min in a hydrogen-nitrogen mixture gas atmosphere containing 4 vol % of hydrogen gas, and heat-treated at 700° C. for 30 minutes. Consequently, a Pt—Co alloy was formed from platinum and cobalt, and thus an electrode catalyst (hereafter also referred to as an "electrode catalyst (1)") in which the alloy was supported as a catalyst metal was obtained. FIG. 3 illustrates a transmission electron micrograph of the electrode catalyst (1). In FIG. 3, (5) indicates the carbon particles B(1), (6) indicates the carbon particles A(1), and (7) indicates the catalyst metal (Pt—Co alloy). It can be confirmed from FIG. 3 that the catalyst metal is dispersedly supported on both the carbon particles B(1) and the carbon particles A(1) in a uniform manner in the electrode catalyst (1).

(Production and Evaluation of Fuel Cell)

(1) Preparation of Cathode Ink

Thirty-five milligrams of the electrode catalyst (1), 0.315 g of an aqueous solution (5% aqueous Nafion solution manufactured by Wako Pure Chemical Industries, Ltd.) containing 15.8 mg of a proton conducting material (Nafion (registered trademark)), 2.0 mL of pure water, and 2.0 mL of 2-propanol were weighed in a vial. The resulting mixture was subjected to ultrasonic irradiation in water with ice for 30 minutes to prepare a cathode ink (1).

(2) Production of Cathode

A gas diffusion layer (carbon paper (TGP-H-060 manufactured by Toray Industries, Inc.)) was immersed in acetone for 30 seconds to perform degreasing, dried, and then immersed in a 10% polytetrafluoroethylene (PTFE) aqueous solution for 30 seconds. The immersed object was dried at room temperature and then heated at 350° C. for 1 hour to obtain a gas diffusion layer (hereafter also referred to as a "GDL") in which the PTFE was dispersed in the carbon paper and which had water repellency. The cathode ink (1) was then applied onto the surface of a GDL having a size of 5 cm×5 cm at 80° C. using an automatic spraying device (manufactured by SAN-EI TECH Ltd.) to produce an electrode (hereafter also referred to as a "cathode (1)") including a cathode catalyst layer formed on the GDL surface. In the cathode catalyst layer, the total amount of the electrode catalyst (1) per unit area was 0.20 mg/cm$^2$.

(3) Preparation of Anode Ink

To 50 ml of pure water, 0.6 g of a platinum-supported carbon catalyst (TEC10E70TPM manufactured by Tanaka Kikinzoku Kogyo) and 5 g of an aqueous solution containing 0.25 g of a proton conducting material (5% aqueous Nafion solution manufactured by Wako Pure Chemical Industries, Ltd.) were added. Mixing was performed with an ultrasonic disperser for 1 hour to prepare an anode ink (1).

(4) Production of Anode

As in the case of the production of the cathode, the anode ink (1) was applied onto the surface of a GDL having a size of 5 cm×5 cm at 80° C. using an automatic spraying device (manufactured by SAN-EI TECH Ltd.) to produce an electrode (hereafter also referred to as an "anode (1)") including an anode catalyst layer formed on the GDL surface. In the anode catalyst layer, the total amount of the platinum-supported carbon catalyst per unit area was 1.00 mg/cm$^2$.

(5) Production of Membrane Electrode Assembly

A Nafion (registered trademark) film (NR-212 manufactured by DuPont) was provided as an electrolyte membrane. The cathode (1) was provided as a cathode. The anode (1) was provided as an anode. A membrane electrode assembly (hereafter also referred to as an "MEA") for fuel cells in which the electrolyte membrane was disposed between the cathode (1) and the anode (1) was produced as follows. The electrolyte membrane was sandwiched between the cathode (1) and the anode (1), and they were subjected to thermocompression bonding using a hot pressing machine at 140° C. at 3 MPa over 7 minutes so that the cathode catalyst layer (1) and the anode catalyst layer (1) were brought in close contact with the electrolyte membrane to produce an MEA (1).

(6) Production of Single Cell

The MEA (1) was sequentially sandwiched between two sealing members (gaskets), between two separators with gas channels, between two current collectors, and between two rubber heaters. The periphery thereof was bolted so that a predetermined surface pressure (4 N) was achieved. Thus, a single cell (hereafter also referred to as a "single cell (1)") of a solid polymer fuel cell was produced (cell area: 25 cm$^2$).

(7) Evaluation of Current-Voltage Characteristics

In the evaluation of fuel cells under typical humidification conditions (hereafter also simply referred to as "humidification conditions"), the temperature of the single cell (1) was adjusted to 80° C., the temperature of an anode humidifier was adjusted to 80° C., and the temperature of a cathode humidifier was adjusted to 80° C. Then, hydrogen was supplied to the anode as a fuel and air was supplied to the cathode. The current-voltage (I-V) characteristics of the single cell (1) were evaluated. In the evaluation of fuel cells under low-humidification conditions, the temperature of the single cell (1) was adjusted to 65° C., the temperature of the anode humidifier was adjusted to 65° C., and the temperature of the cathode was adjusted to 65° C. without humidification, and the current-voltage (I-V) characteristics were evaluated.

(8) Potential Cycling Durability Test

The potential cycling durability test was performed under the following conditions.

The temperature of the single cell (1) was adjusted to 80° C., the temperature of the anode humidifier was adjusted to 80° C., and the temperature of the cathode humidifier was adjusted to 80° C. In this state, 2000 triangular wave potential cycles of 1.0 V-1.5 V and 1.5 V-1.0 V were performed while hydrogen was supplied to the anode and nitrogen was supplied to the cathode.

The current-voltage characteristics under the above-described humidification conditions were also evaluated before and after the 2000 potential cycles were performed in the potential cycling durability test. As shown in the formula below, the ratio (%) of voltages obtained from the current-voltage measurement at 0.2 A/cm$^2$ before and after the potential cycles is defined as a voltage retention rate.

Voltage retention rate=(Voltage after potential cycles)/(Voltage before potential cycles)×100

In the I-V characteristics of a fuel cell, the voltage at a certain current density is an index of the power generation performance of the fuel cell. That is, the higher the initial voltage, the higher the initial power generation performance of fuel cells, which means that the catalytic activity of an oxygen-reducing catalyst is high. Furthermore, as the voltage retention rate increases, the degradation of the power generation performance of fuel cells is suppressed, which means that the degradation of the catalytic activity of an oxygen-reducing catalyst is suppressed. In other words, the durability is high. Table 1 shows the initial voltage and voltage retention rate at 0.2 A/cm$^2$ under the humidification conditions and the low-humidification conditions.

Example 2

A catalyst carrier (2) was produced by producing the carbon particles B(1) and mixing the carbon material (1) and the carbon particles B(1) in the same manner as in Example 1, except that the content of the titanium dioxide particles was set to 59 mass % relative to the total mass of the catalyst carrier (2).

Subsequently, in the same manner as in Example 1, platinum and cobalt were supported on the catalyst carrier (2), the heat treatment was performed to form an alloy of platinum and cobalt, thereby producing an electrode catalyst (2), and a fuel cell was produced and evaluated. Table 1 shows the results.

Example 3

A catalyst carrier (3) was produced by producing the carbon particles B(1) and mixing the carbon material (1) and the carbon particles B(1) in the same manner as in Example 1, except that the content of the titanium dioxide particles was set to 25 mass % relative to the total mass of the catalyst carrier (3).

Subsequently, in the same manner as in Example 1, platinum and cobalt were supported on the catalyst carrier (3), the heat treatment was performed to form an alloy of platinum and cobalt, thereby producing an electrode catalyst (3), and a fuel cell was produced and evaluated. Table 1 shows the results.

Example 4

A catalyst carrier (4) was produced in the same manner as in Example 1, except that a commercially available carbon material (2) (BET specific surface area: 563 m$^2$/g, DBP absorption: 295 mL/100 g, crystallite size: 3.2 nm, a carbon material having a chain structure including carbon nanoparticles) was used instead of the carbon material (1). Herein, the content of the titanium dioxide particles was set to 42 mass % relative to the total mass of the catalyst carrier (4).

Subsequently, in the same manner as in Example 1, platinum and cobalt were supported on the catalyst carrier (4), the heat treatment was performed to form an alloy of platinum and cobalt, thereby producing an electrode catalyst (4), and a fuel cell was produced and evaluated. Table 1 shows the results.

Example 5

A catalyst carrier (5) was produced in the same manner as in Example 1, except that a mixture (the mass ratio is carbon material (1):carbon material (3)=5:5, BET specific surface area: 760 m$^2$/g) (hereafter also referred to as a "carbon material (4)") of a commercially available carbon material (BET specific surface area: 1350 m$^2$/g) and a carbon material (3) (graphitized carbon black obtained by calcining commercially available carbon black in a N$_2$ atmosphere at 2200° C. for 4 hours, BET specific surface area: 170 m$^2$/g, primary particle size: 40 nm, crystallite size: 3.5 nm, a carbon material having a chain structure including carbon nanoparticles) was used instead of the carbon material (1) in Example 1. The content of the titanium dioxide particles was set to 25 mass % relative to the total mass of the catalyst carrier (5). FIG. 4 illustrates a transmission electron micrograph of the catalyst carrier (5).

Subsequently, in the same manner as in Example 1, platinum and cobalt were supported on the catalyst carrier (5), the heat treatment was performed to form an alloy of platinum and cobalt, thereby producing an electrode catalyst (5), and a fuel cell was produced and evaluated. Table 1 shows the results. FIG. 5 illustrates a transmission electron micrograph of the electrode catalyst (5).

Example 6

A catalyst carrier (6) was produced in the same manner as in Example 1, except that a mixture (the mass ratio is commercially available carbon material:carbon material (3)=2:1, BET specific surface area: 955 m$^2$/g) (hereafter also referred to as a "carbon material (5)") of a commercially available carbon material (BET specific surface area: 1350 m$^2$/g) and the carbon material (3) was used instead of the carbon material (1) in Example 1. The content of the titanium dioxide particles was set to 59 mass % relative to the total mass of the catalyst carrier (6).

Subsequently, in the same manner as in Example 1, platinum and cobalt were supported on the catalyst carrier (6), the heat treatment was performed to form an alloy of platinum and cobalt, thereby producing an electrode catalyst (6), and a fuel cell was produced and evaluated. Table 1 shows the results.

Example 7

(Production of Carbon Particles B(2))

Carbon particles (hereafter also referred to as "carbon particles B(2)") that enclose zirconium dioxide particles were produced in the same manner as in Example 1, except that zirconium dioxide particles (average particle size: 20 nm, manufactured by NIPPON DENKO Co., Ltd.) were used instead of the titanium dioxide particles in Example 1.

A catalyst carrier (7) was produced in the same manner as in Example 1, except that the carbon particles B(2) were used instead of the carbon particles B(1). The content of the zirconium dioxide particles was set to 42 mass % relative to the total mass of the catalyst carrier (7).

Subsequently, in the same manner as in Example 1, platinum and cobalt were supported on the catalyst carrier (7), the heat treatment was performed to form an alloy of platinum and cobalt, thereby producing an electrode catalyst (7), and a fuel cell was produced and evaluated. Table 1 shows the results.

Example 8

Carbon particles B(3) were produced using nitrogen gas containing 100 vol % of nitrogen instead of the hydrogen-nitrogen mixture gas containing 4 vol % of hydrogen in Example 1. A catalyst carrier (8) was produced in the same manner as in Example 1, except that the carbon particles B(3) were used instead of the carbon particles B(1). The content of the titanium dioxide particles was set to 42 mass % relative to the total mass of the catalyst carrier (8).

Subsequently, in the same manner as in Example 1, platinum and cobalt were supported on the catalyst carrier (8), the heat treatment was performed to form an alloy of platinum and cobalt, thereby producing an electrode catalyst (8), and a fuel cell was produced and evaluated. Table 1 shows the results.

Comparative Example 1

A catalyst carrier (9) was produced in the same manner as in Example 1, except that the titanium dioxide particles used as a raw material for the carbon particles B(1) in Example 1 were used instead of the carbon particles B(1). The content of the titanium dioxide particles was set to 50 mass % relative to the total mass of the catalyst carrier (9).

Subsequently, in the same manner as in Example 1, platinum and cobalt were supported on the catalyst carrier (9), the heat treatment was performed to form an alloy of platinum and cobalt, thereby producing an electrode catalyst (9), and a fuel cell was produced and evaluated. Table 1 shows the results.

Comparative Example 2

An electrode catalyst (10) was produced in the same manner as in Example 1, except that the carbon material (1) was used as a catalyst carrier (10) instead of the catalyst carrier (1).

Subsequently, a fuel cell was produced and evaluated in the same manner as in Example 1. Table 1 shows the results.

Comparative Example 3

An electrode catalyst (11) was produced in the same manner as in Example 1, except that the carbon particles B(1) were used as a catalyst carrier (11) instead of the catalyst carrier (1).

Subsequently, a fuel cell was produced and evaluated in the same manner as in Example 1. Table 1 shows the results.

Comparative Example 4

An electrode catalyst (12) was produced in the same manner as in Example 1, except that the carbon material (3) was used as a catalyst carrier (12) instead of the catalyst carrier (1) in Example 1.

Subsequently, a fuel cell was produced and evaluated in the same manner as in Example 1. Table 1 shows the results.

Comparative Example 5

A catalyst carrier (13) was produced in the same manner as in Example 1, except that the carbon material (3) was used instead of the carbon material (1) in Example 1. The content of the titanium dioxide particles was set to 42 mass % relative to the total mass of the catalyst carrier (13).

Subsequently, in the same manner as in Example 1, platinum and cobalt were supported on the catalyst carrier (13), the heat treatment was performed to form an alloy of platinum and cobalt, thereby producing an electrode catalyst (13), and a fuel cell was produced and evaluated. Table 1 shows the results.

Comparative Example 6

(Production of Carbon Particles B(4))

Oxide-carbon composite particles (hereafter also referred to as "carbon particles B(4)") in which carbon encloses iron(III) oxide particles were produced in the same manner as in Example 1, except that commercially available iron(III) oxide particles (average particle size: 10 to 15 nm) were used instead of the titanium dioxide particles in Example 1.

A catalyst carrier (14) was produced in the same manner as in Example 1, except that the carbon particles B(4) were used instead of the carbon particles B(1). The content of the iron(III) oxide particles was set to 42 mass % relative to the total mass of the catalyst carrier (14).

Subsequently, in the same manner as in Example 1, platinum and cobalt were supported on the catalyst carrier (14), the heat treatment was performed to form an alloy of platinum and cobalt, thereby producing an electrode catalyst (14), and a fuel cell was produced and evaluated. Table 1 shows the results.

TABLE 1

| | Electrode catalyst | Carbon material | Oxide-carbon composite particles or oxide | DBP specific surface area of catalyst carrier (ml/100 g) | BET specific surface area of catalyst carrier (m2/g) | Content of titanium compound particles (mass %) |
|---|---|---|---|---|---|---|
| Example 1 | Electrode catalyst (1) | Carbon material (1) | Carbon particles B(1) | 245 | 740 | 42 |
| Example 2 | Electrode catalyst (2) | Carbon material (1) | Carbon particles B(1) | 151 | 495 | 59 |
| Example 3 | Electrode catalyst (3) | Carbon material (1) | Carbon particles B(1) | 343 | 985 | 25 |
| Example 4 | Electrode catalyst (4) | Carbon material (2) | Carbon particles B(1) | 150 | 459 | 42 |
| Example 5 | Electrode catalyst (5) | Carbon material (4) | Carbon particles B(1) | 189 | 590 | 25 |
| Example 6 | Electrode catalyst (6) | Carbon material (5) | Carbon particles B(1) | 103 | 451 | 59 |
| Example 7 | Electrode catalyst (7) | Carbon material (1) | Carbon particles B(2) | 245 | 760 | 42 |
| Example 8 | Electrode catalyst (8) | Carbon material (1) | Carbon particles B(3) | 245 | 750 | 42 |
| Comparative Example 1 | Electrode catalyst (9) | Carbon material (1) | Titanium dioxide | 240 | 855 | 50 |
| Comparative Example 2 | Electrode catalyst (10) | Carbon material (1) | — | 490 | 1350 | 0 |
| Comparative Example 3 | Electrode catalyst (11) | — | Carbon particles B(1) | 0 | 120 | 84 |
| Comparative Example 4 | Electrode catalyst (12) | Carbon material (3) | — | 50 | 170 | 0 |
| Comparative Example 5 | Electrode catalyst (13) | Carbon material (3) | Carbon particles B(1) | 25 | 167 | 42 |
| Comparative Example 6 | Electrode catalyst (14) | Carbon material (1) | Carbon particles B(4) | 243 | 702 | 42 (iron oxide) |

| | Initial voltage under humidification conditions (V) | Initial voltage under low-humidification conditions (V) | Ratio of initial voltage under low-humidification conditions to initial voltage under humidification conditions (%) | Voltage retention rate (%) |
|---|---|---|---|---|
| Example 1 | 0.775 | 0.724 | 93 | 63 |
| Example 2 | 0.770 | 0.718 | 93 | 66 |
| Example 3 | 0.779 | 0.721 | 93 | 61 |
| Example 4 | 0.755 | 0.695 | 92 | 71 |
| Example 5 | 0.779 | 0.733 | 94 | 78 |
| Example 6 | 0.768 | 0.722 | 94 | 80 |
| Example 7 | 0.773 | 0.715 | 92 | 60 |
| Example 8 | 0.776 | 0.723 | 93 | 64 |
| Comparative Example 1 | 0.771 | 0.705 | 91 | 55 |
| Comparative Example 2 | 0.766 | 0.68 | 89 | 0 |
| Comparative Example 3 | 0.439 | 0.402 | 92 | 3 |
| Comparative Example 4 | 0.737 | 0.651 | 88 | 96 |
| Comparative Example 5 | 0.757 | 0.595 | 79 | 93 |
| Comparative Example 6 | 0.755 | 0.588 | 78 | 33 |

As shown in Table 1, in Examples 1 to 8, the performance degradation caused when the operation under typical humidification conditions was changed to the operation under low-humidification conditions was suppressed compared with in Comparative Examples. The voltage retention rate was also high and high durability was achieved.

Furthermore, in Examples 1 to 8, high activity was exhibited under the typical humidification conditions and the low-humidification conditions. This may be because a carbon material having a BET specific surface area, a DBP absorption, and a crystallite size suitable in the present invention was selected. In particular, high initial voltage and high durability were exhibited in Example 5. This may be because two carbon materials having different BET specific surface areas, primary particle sizes, and crystallite sizes were suitably selected and mixed.

INDUSTRIAL APPLICABILITY

In the electrode catalyst of the present invention, the degradation of the performance under low-humidification conditions is suppressed and high durability is exhibited. Therefore, a fuel cell having high generation efficiency and high reliability is provided. The fuel cell can be used as a power supply for electric vehicles and a power supply for household cogeneration and the like.

The invention claimed is:

1. A catalyst carrier comprising a carbon material having a chain structure including a chain of carbon particles, and an oxide-carbon composite particle in which a carbon particle encloses a particle of an oxide of a group IV element on the periodic table, the oxide-carbon composite particle being contained in the carbon material, wherein the catalyst carrier has a BET specific surface area of 450 to 1100 $m^2/g$, and
   wherein the particle of the oxide of the group IV element on the periodic table has an average particle size of 5 to 300 nm.

2. The catalyst carrier according to claim 1, wherein the catalyst carrier has a dibutyl phthalate absorption of 150 to 450 mL/100 g.

3. The catalyst carrier according to claim 1, wherein a content of the particle of the oxide is 10 to 90 mass %.

4. The catalyst carrier according to claim 1, wherein the group IV element on the periodic table is titanium or zirconium.

5. The catalyst carrier according to claim 1, wherein carbon that encloses the particle of the oxide of the group IV element on the periodic table in the oxide-carbon composite particle is amorphous carbon and/or graphitized carbon.

6. The catalyst carrier according to claim 1, wherein the carbon material is one selected from the group consisting of carbon black, graphitized carbon black, graphite, and porous carbon.

7. The catalyst carrier according to claim 1, wherein the carbon material is a mixture of two or more selected from the group consisting of carbon black, graphitized carbon black, graphite, and porous carbon.

8. The catalyst carrier according to claim 1, wherein the carbon material has a primary particle size of 5 to 300 nm.

9. An electrode catalyst in which a catalyst metal particle is supported on the catalyst carrier according to claim 1.

10. The electrode catalyst according to claim 9, wherein a metal of the catalyst metal particle is at least one metal selected from the group consisting of platinum, palladium, ruthenium, gold, rhodium, iridium, osmium, iron, cobalt, nickel, chromium, zinc, and tantalum, or an alloy formed of at least two of the foregoing metals.

11. The electrode catalyst according to claim 9, wherein the electrode catalyst has a BET specific surface area of 200 to 800 $m^2/g$.

12. An electrode comprising an electrode substrate and a catalyst layer containing the electrode catalyst according to claim 9, the catalyst layer being formed on the electrode substrate.

13. A membrane electrode assembly comprising a cathode and an anode with an electrolyte membrane disposed therebetween,
   wherein at least one of the cathode and the anode is the electrode according to claim 12.

14. A fuel cell comprising the membrane electrode assembly according to claim 13.

15. A method for producing a catalyst carrier, comprising a step of mixing a particle of an oxide of a group IV element on the periodic table and polyvinyl alcohol and heat-treating the mixture in a non-oxidizing gas atmosphere at 500° C. to 1100° C. to obtain an oxide-carbon composite particle in which carbon encloses the particle of the oxide of the group IV element on the periodic table, and a step of mixing a carbon material having a chain structure including a chain of carbon particles and the oxide-carbon composite particle.

16. The method for producing a catalyst carrier according to claim 15, wherein the particle of the oxide of the group IV element on the periodic table has a BET specific surface area of 50 to 300 $m^2/g$.

17. The method for producing a catalyst carrier according to claim 15, wherein the carbon material has a dibutyl phthalate absorption of 350 to 550 mL/100 g.

18. The method for producing a catalyst carrier according to claim 15, wherein the carbon material has a BET specific surface area of 700 to 1400 $m^2/g$.

19. The method for producing a catalyst carrier according to claim 15, wherein the carbon material has a crystallite size of 0.6 to 2.0 nm.

20. The method for producing a catalyst carrier according to claim 15, wherein the carbon material is a mixture of a carbon material X having a BET specific surface area of 700 to 1400 $m^2/g$ and a carbon material Y having a BET specific surface area of 100 to 500 $m^2/g$.

21. The method for producing a catalyst carrier according to claim 20, wherein the carbon material Y has a primary particle size of 5 to 300 nm and a crystallite size of 2.0 to 5.0 nm.

22. The method for producing a catalyst carrier according to claim 15, wherein the carbon material and the oxide-carbon composite particle are mixed using a ball mill.

* * * * *